United States Patent
Cristescu et al.

(10) Patent No.: US 11,328,524 B2
(45) Date of Patent: May 10, 2022

(54) SYSTEMS AND METHODS FOR AUTOMATIC DATA EXTRACTION FROM DOCUMENT IMAGES

(71) Applicant: UiPath Inc., New York, NY (US)

(72) Inventors: Horia Cristescu, Bucharest (RO); Stefan A. Adam, Bucharest (RO); Mircea Neagovici, Bellevue, WA (US)

(73) Assignee: UiPath Inc., New York, NY (US)

( * ) Notice: Subject to any disclaimer, the term of this patent is extended or adjusted under 35 U.S.C. 154(b) by 267 days.

(21) Appl. No.: 16/504,838

(22) Filed: Jul. 8, 2019

(65) Prior Publication Data

US 2021/0012102 A1    Jan. 14, 2021

(51) Int. Cl.
  *G06K 9/00*   (2022.01)
  *G06F 16/56*  (2019.01)
  (Continued)

(52) U.S. Cl.
  CPC ............ *G06V 30/414* (2022.01); *G06F 16/56* (2019.01); *G06F 16/5846* (2019.01);
  (Continued)

(58) Field of Classification Search
  CPC .... G06F 16/56; G06F 16/5846; G06F 40/284; G06F 40/131; G06F 40/20; G06F 40/216;
  (Continued)

(56) References Cited

U.S. PATENT DOCUMENTS 5,774,580 A * 6/1998 Saitoh ............... G06K 9/00442
                                                    382/176
5,822,454 A   10/1998 Rangarajan
              (Continued)

OTHER PUBLICATIONS

Palm et al., "CloudScan—A configuration-free invoice analysis system using recurrent neural networks," https://arxiv.org/abs/1708.07403v1. Aug. 2017.
(Continued)

*Primary Examiner* — Michael J Vanchy, Jr.
(74) *Attorney, Agent, or Firm* — Law Office of Andrei D Popovici, PC

(57) ABSTRACT

Described systems and methods allow the automatic extraction of structured information from images of structured text documents such as invoices and receipts. Some embodiments employ optical character recognition (OCR) technology to extract individual text tokens (e.g., words) and token bounding boxes from a document image. A feature vector of each text token comprises a first part determined according to a character content of the text token, and a second part determined according to an image content of the token's bounding box. A neural network classifier produces a label indicative of a type of information (e.g. "billing address", "due date", etc.) carried by each text token. In some embodiments, documents are linearized by ordering text tokens in a sequence according to a reading order of a natural language (e.g., English, Arabic) in which the respective document is formulated. Token feature vectors are fed to the classifier in the order indicated by the token sequence.

21 Claims, 13 Drawing Sheets

(51) Int. Cl.
*G06F 16/583* (2019.01)
*G06F 17/27* (2006.01)
*G06K 9/46* (2006.01)
*G06V 30/414* (2022.01)
*G06F 40/284* (2020.01)
*G06V 10/40* (2022.01)
*G06V 30/413* (2022.01)
*G06V 30/416* (2022.01)

(52) U.S. Cl.
CPC ............ *G06F 40/284* (2020.01); *G06V 10/40* (2022.01); *G06V 30/413* (2022.01); *G06V 30/416* (2022.01)

(58) Field of Classification Search
CPC ...... G06F 40/242; G06F 40/279; G06F 40/30; G06K 2209/01; G06K 9/00449; G06K 9/00456; G06K 9/00463; G06K 9/00469; G06K 9/46; G06K 9/6271; G06K 9/00442; G06K 9/6218; G06N 3/04; G06N 3/0454; G06N 3/08; G06N 3/084
See application file for complete search history.

(56) References Cited

U.S. PATENT DOCUMENTS

| | | | |
|---|---|---|---|
| 7,809,615 | B2 | 10/2010 | Hui et al. |
| 10,019,740 | B2 | 7/2018 | Simantov et al. |
| 2015/0093033 | A1 | 4/2015 | Kwon et al. |
| 2017/0351913 | A1* | 12/2017 | Chen ................... G06K 9/00442 |
| 2018/0081535 | A1* | 3/2018 | Murakawa ............ G06F 40/171 |
| 2018/0373952 | A1* | 12/2018 | Bui ........................ G06Q 10/06 |
| 2019/0385054 | A1* | 12/2019 | Zuev ..................... G06F 40/216 |
| 2020/0143349 | A1* | 5/2020 | Lau ....................... G06Q 20/322 |
| 2020/0174870 | A1* | 6/2020 | Xu ....................... G06F 11/0772 |

OTHER PUBLICATIONS

Katti et al., "Chargrid: Towards Understanding 2D Documents," https://arxiv.org/abs/1809.08799v1, Sep. 2018.

Raoui-Outach et al., "Deep Learning for automatic sale receipt understanding," https://arxiv.org/abs/1712.01606v1, Dec. 2017.

* cited by examiner

SYSTEMS AND METHODS FOR AUTOMATIC DATA EXTRACTION FROM DOCUMENT IMAGES

BACKGROUND

The invention relates to systems and methods for automatic document processing.

Robotic process automation (RPA) is an emerging field of information technology aimed at improving productivity by automating repetitive computing tasks, thus freeing human operators to perform more intellectually sophisticated and/or creative activities.

Invoice processing is an especially high-volume, labor-intensive activity, especially when the respective invoices are printed on paper. A human operator may have to read data from the printed invoice and manually enter it into a computer interface so it can be further processed. This operation may require substantial manpower, especially in large corporation where a procurement department may need to process thousands of documents. There is therefore substantial interest in automating such processes.

However, automating the extraction of structured data from paper documents such as invoices and receipts is a formidable technical feat. Invoice layout may vary substantially among vendors, so there may be no a-priori knowledge of where various kinds of information are located on the page.

SUMMARY

According to one aspect, a method comprises employing at least one hardware processor of a computer system to receive a text token extracted from a document image, the text token comprising a sequence of characters. The document image comprises an encoding of an image of a structured paper document. The structured paper document is partitioned into a plurality of fields and has a plurality of text tokens distributed among the plurality of fields, each field of the plurality of fields having a distinct field type characterizing a distinct category of information represented by text tokens located within the each field. The method further comprises employing at least one hardware processor of the computer system to receive a token box indicator comprising an indicator of a polygon enclosing a region of the document image, the region containing an image of the text token. The method further comprises employing at least one hardware processor of the computer system to determine a text feature vector characterizing the text token as a whole, the text feature vector determined according to the character sequence, and to determine an image feature vector characterizing the image of the text token as a whole, the image feature vector determined according to the document image and according to the token box indicator. The method further comprises employing at least one hardware processor of the computer system to determine a field type of a field containing the text token according to the text feature vector and the image feature vector.

According to another aspect, a computing system comprises at least one hardware processor configured to execute a text feature extractor, an image feature extractor, and a token classifier connected to the text feature extractor and the image feature extractor. The text feature extractor is configured to receive a text token extracted from a document image, the text token comprising a sequence of characters, the document image comprising an encoding of an image of a structured paper document. The structured paper document is partitioned into a plurality of fields and has a plurality of text tokens distributed among the plurality of fields, each field of the plurality of fields having a distinct field type characterizing a distinct category of information represented by text tokens located within the each field. The text feature extractor is further configured to determine a text feature vector characterizing the text token as a whole, the text feature vector determined according to the character sequence. The image feature extractor is configured to receive a token box indicator comprising an indicator of a polygon enclosing a region of the document image, the region containing an image of the text token, and to determine an image feature vector characterizing the image of the text token as a whole, the image feature vector determined according to the document image and according to the token box indicator. The token classifier is configured to determine a field type of a field containing the text token according to text feature vector and the image feature vector.

According to another aspect, a non-transitory computer-readable medium stores instructions which, when executed by at least one hardware processor of a computing system, cause the computing system to form a text feature extractor, an image feature extractor, and a token classifier connected to the text feature extractor and the image feature extractor. The text feature extractor is configured to receive a text token extracted from a document image, the text token comprising a sequence of characters, the document image comprising an encoding of an image of a structured paper document. The structured paper document is partitioned into a plurality of fields and has a plurality of text tokens distributed among the plurality of fields, each field of the plurality of fields having a distinct field type characterizing a distinct category of information represented by text tokens located within the each field. The text feature extractor is further configured to determine a text feature vector characterizing the text token as a whole, the text feature vector determined according to the character sequence. The image feature extractor is configured to receive a token box indicator comprising an indicator of a polygon enclosing a region of the document image, the region containing an image of the text token, and to determine an image feature vector characterizing the image of the text token as a whole, the image feature vector determined according to the document image and according to the token box indicator. The token classifier is configured to determine a field type of a field containing the text token according to text feature vector and the image feature vector.

BRIEF DESCRIPTION OF THE DRAWINGS

The foregoing aspects and advantages of the present invention will become better understood upon reading the following detailed description and upon reference to the drawings where:

FIG. 3-B shows another exemplary structured document (receipt) according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
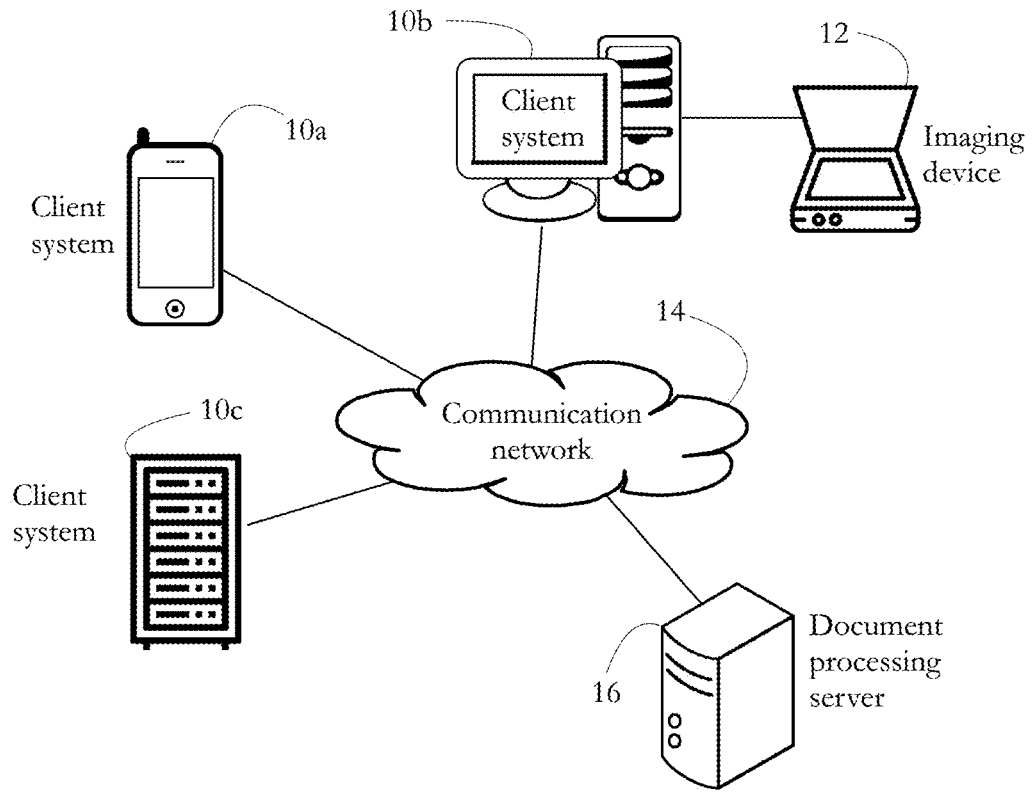
FIG. 1 shows an exemplary system for automatic extraction of data from document images, according to some embodiments of the present invention.

FIG. 1 shows an exemplary system for automatic extraction of data from document images according to some embodiments of the present invention. In the illustrated example, a set of client systems 10a-c is communicatively coupled to a document processing server 16 via a communication network 14. Client systems 10a-c generically represent any computing appliance comprising a processor, a memory unit, and a communication interface. Exemplary client systems 10a-c include a corporate mainframe computer, a personal computer, a mobile computing device (e.g., tablet computer, laptop computer), a mobile telecommunications device (e.g., smartphone), a digital camera, a media player, and a wearable computing device (e.g., smartwatch), among others. Parts of communication network 14 may include a local area network (LAN) further connected to a wide area network such as the Internet.

Figure 2:
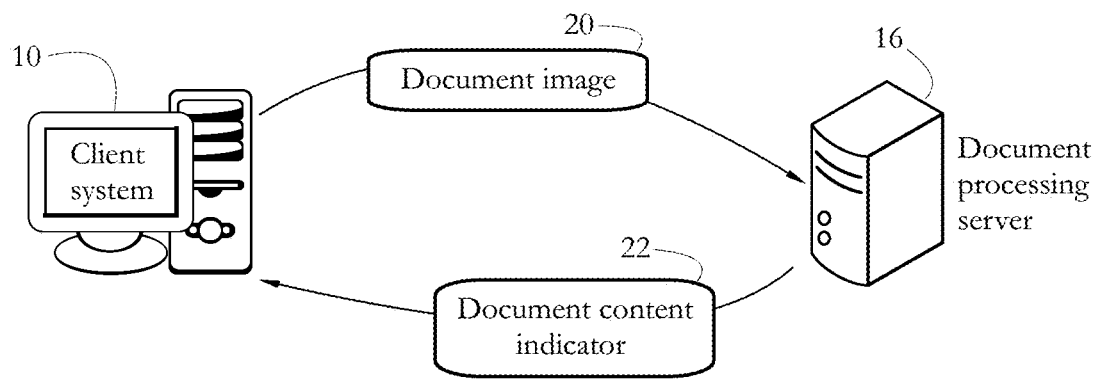
FIG. 2 shows an exemplary data exchange between a client system and a document processing server according to some embodiments of the present invention.

Document processing server 16 generically represents a set of communicatively-coupled computer systems which may or may not be in physical proximity to each other. Server 16 is configured to extract data from document images provided by client systems 10a-c as shown in detail below. In one typical data exchange according to some embodiments of the present invention (FIG. 2), server 16 receives a document image 20 from a client system 10 and in response, transmits a document content indicator 22 back to the respective client system. In one example, the illustrated data exchange may occur via a web interface executing on server 16.

Document image 20 comprises an encoding of an optical image of a printed document. Image 20 may be acquired using an imaging device 12 (FIG. 1) which may be of any type known in the art (e.g., scanner, digital camera, etc.). The format, size, and encoding of image 20 may very among embodiments.

Without loss of generality, the following description will focus on scraping data from accounting/commercial documents such as invoices and receipts. A skilled artisan will appreciate that the systems and methods described herein may be adapted to extracting data from other types of structured documents/printed matter (e.g., identity cards, business cards, flyers, merchandise catalogs and brochures, restaurant menus, etc.).

Figure 3:
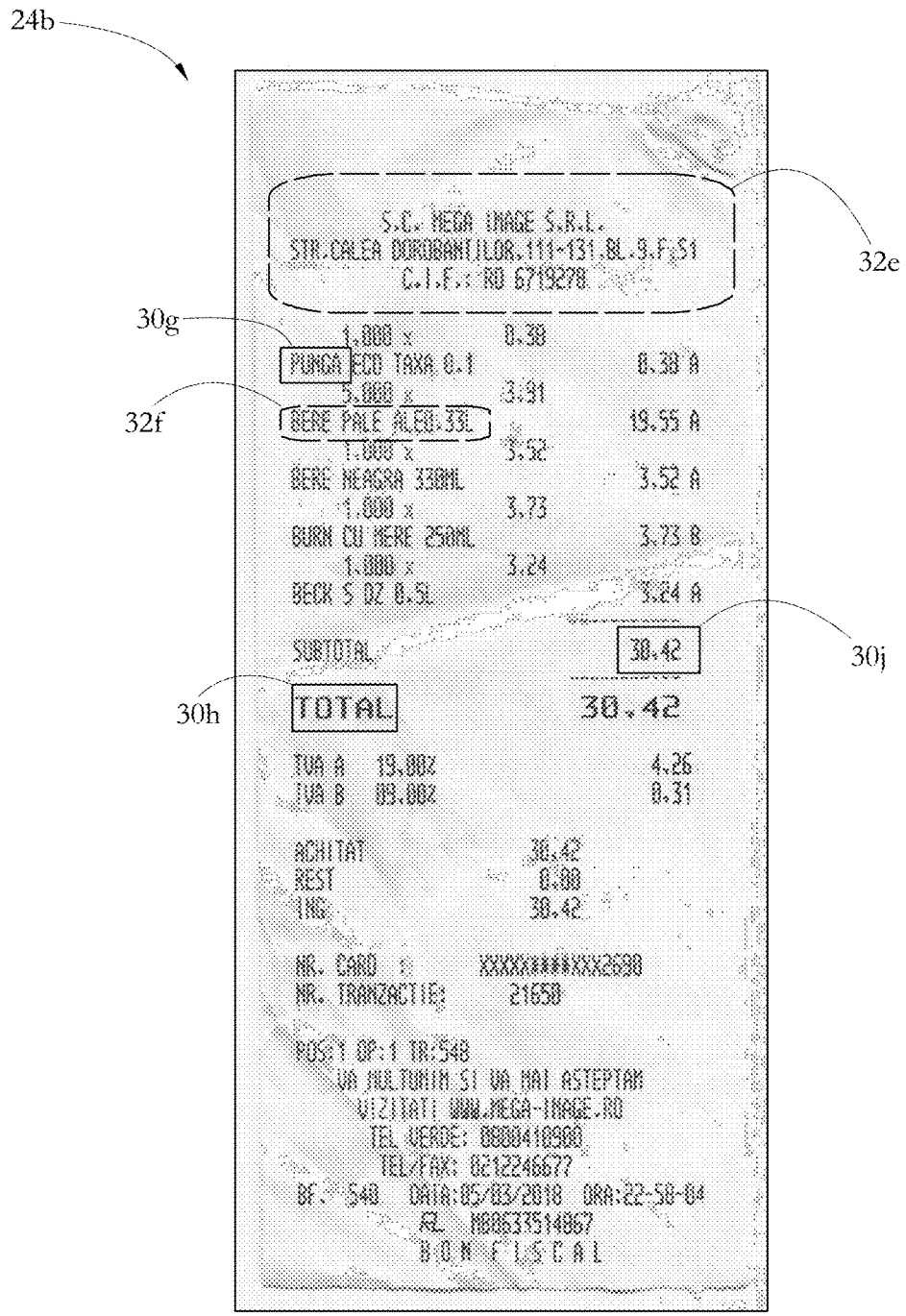
FIG. 3-A illustrates an exemplary structured document (invoice) having a set of text tokens and fields according to some embodiments of the present invention.

FIGS. 3-A-B show exemplary structured text documents according to some embodiments of the present invention. Structured text documents comprise text and optionally other graphical objects (lines, charts, photographs, icons, etc.). Examples of text include a printed sequence of characters, for instance a word from the vocabulary of a natural language (e.g., English, Arabic, Japanese), as well as a number. Text may include special characters (e.g., $, %, @), punctuation marks, emoji characters, and scientific symbols, among others. The term structured text document is used herein to denote a document partitioned into a plurality of fields/regions, wherein the text content of each field encodes a distinct category/type of information. For instance, a date field contains a date, an address field contains an address, while a price field contains the price of an item. In another example, each cell of a table may constitute a distinct field. The type, count, position, and extent of individual fields may vary among documents, and is not known a priori. In some embodiments, extracting structured data from such documents comprises selectively extracting a text content of each field, and labeling the respective content with an indicator of a field type/category of the respective field.

FIGS. 3-A-B show an exemplary invoice 24a and receipt 24b, respectively, having a set of text fields 32a-f of various field types. In the case of an invoice, exemplary field types may include, among others: Vendor name, Vendor address, Buyer name, Billing address, Shipping address, Invoice number, Purchase order number, Invoice date, Tax due, Total due, Payment terms, Currency, Item description, Item quantity, Item unit price, Item line amount, Item purchase order number, Item number, and Item part number. In the example of FIG. 3-A, field 32a contains a billing name and address, field 32b contains an invoice date, items 32c-d contain an item description and a total amount due, respectively. In turn, in the example of FIG. 3-B, field 32e contains a service provider name and address. Individual fields may span multiple text lines.

In some embodiments, each text field comprises a set of text tokens, such as exemplary text tokens 30a-j in FIGS. 3-A-B. Unless otherwise specified, a text token consists of a sequence of characters bookended by any of a set of pre-determined delimiters (e.g., white space, certain punctuation characters such as a semicolon and a period, certain special characters such as $, %, -, @, etc.). A simple example of a text token is a word of a natural language. Other examples of text tokens include a number, a date, an email address, a uniform resource identifier (URI), and a postcode, among others. Some text fields may comprise a single text token (e.g., field 32d in FIG. 3-A), while other text fields may consist of multiple text tokens (e.g., fields 32e and 32f in FIG. 3-B).

In some embodiments, document processing server 16 is configured to automatically identify text fields from document image 20, and to return a content of the respective fields as document content indicator 22. Data extraction from image 20 may further comprise identifying a field type of each detected field. Field types may be selected from a set of pre-determined options, e.g., "Billing Address", "Subtotal", "Total due", "Invoice Number", "Invoice date", etc. An exemplary content indicator 22 may comprise a set of attribute-value pairs, for instance a set of tuples {{FieldType1, FieldContent1, FieldPosition1}, {FieldType2, FieldContent2, FieldPosition2}, . . . }. The information contained in content indicator 22 may be formatted according to any data specification known in the art. For instance, the set of exemplary tuples described above may be encoded using a version of Extensible Markup Language (XML) or JavaScript Object Notation (JSON). Other embodiments may format document content indicator 22 as a table (e.g., comma-separated values—CSV) or may use some proprietary data format such as Microsoft Excel® or Oracle Database®.

In an alternative embodiment, document content indicator 22 comprises structured data specified at a granularity of individual text tokens. In one such example, in response to receiving document image 20, server 16 may return a set of text tokens extracted from image 20. For each text token, indicator 22 may further comprise an indicator of a field type of the respective token (an exemplary field type indicator may indicate, for instance, that a particular token is of a "Shipping Address" type), and an indicator of a position of the respective token within document image 20.

Figure 4:
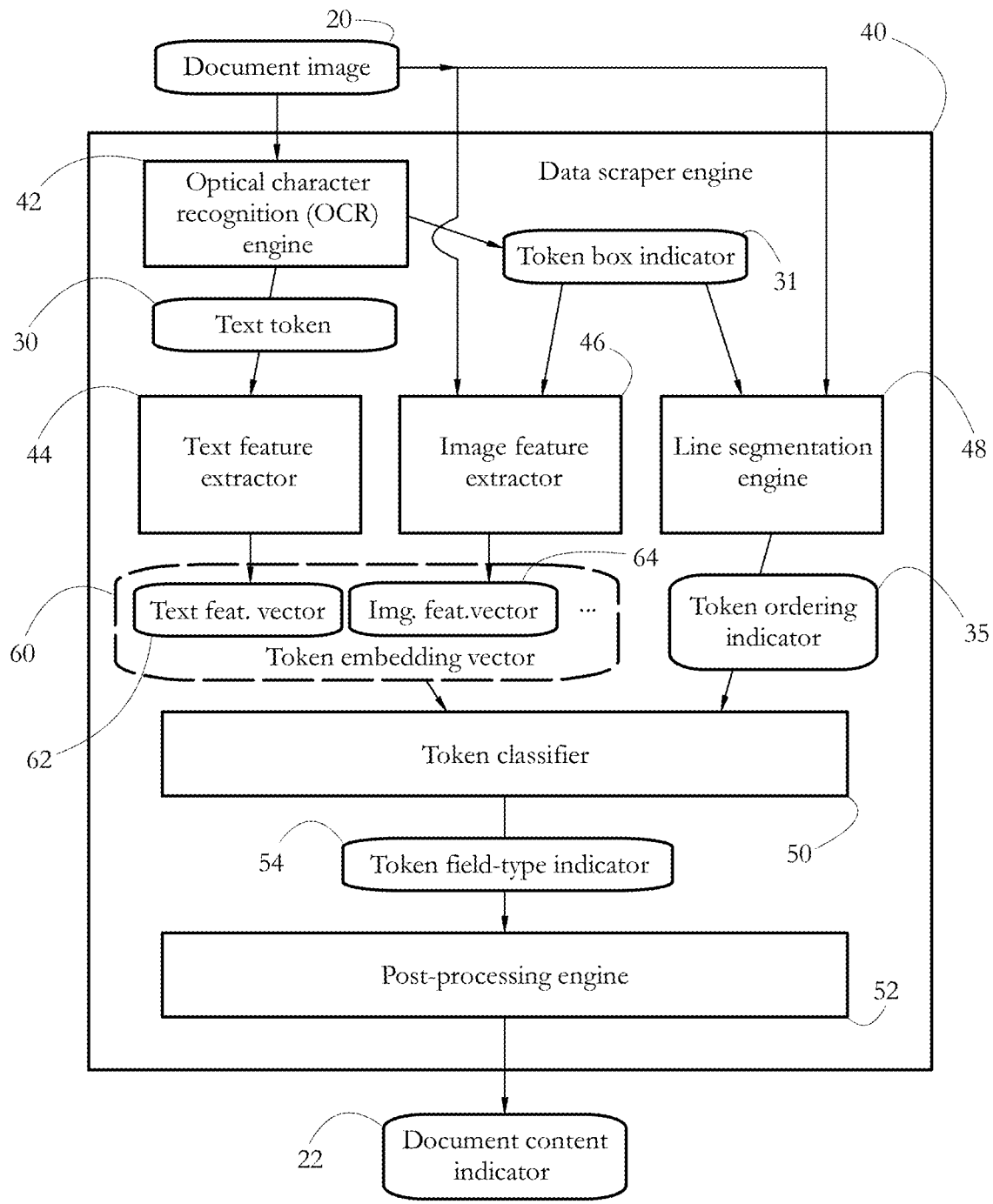
FIG. 4 shows exemplary components and operation of a data scraper engine according to some embodiments of the present invention.

FIG. 4 shows an exemplary data scraping engine 40 according to some embodiments of the present invention. Engine 40 may be embodied as a computer program executing on document processing server 16. An artisan will appreciate that not all illustrated components of data scraping engine 40 need to execute on the same physical machine/processor. Instead, some components may execute on separate communicatively-coupled machines or on separate processors of the same physical machine, for instance in a parallel computing configuration. Similarly, a skilled artisan will understand that various components may be implemented in hardware (e.g., field-programmable gate arrays—FPGA or application-specific integrated circuits—ASIC) or firmware. Data scraping engine 40 may receive document image 20 and output document content indicator 22 computed according to document image 20.

Figure 5:
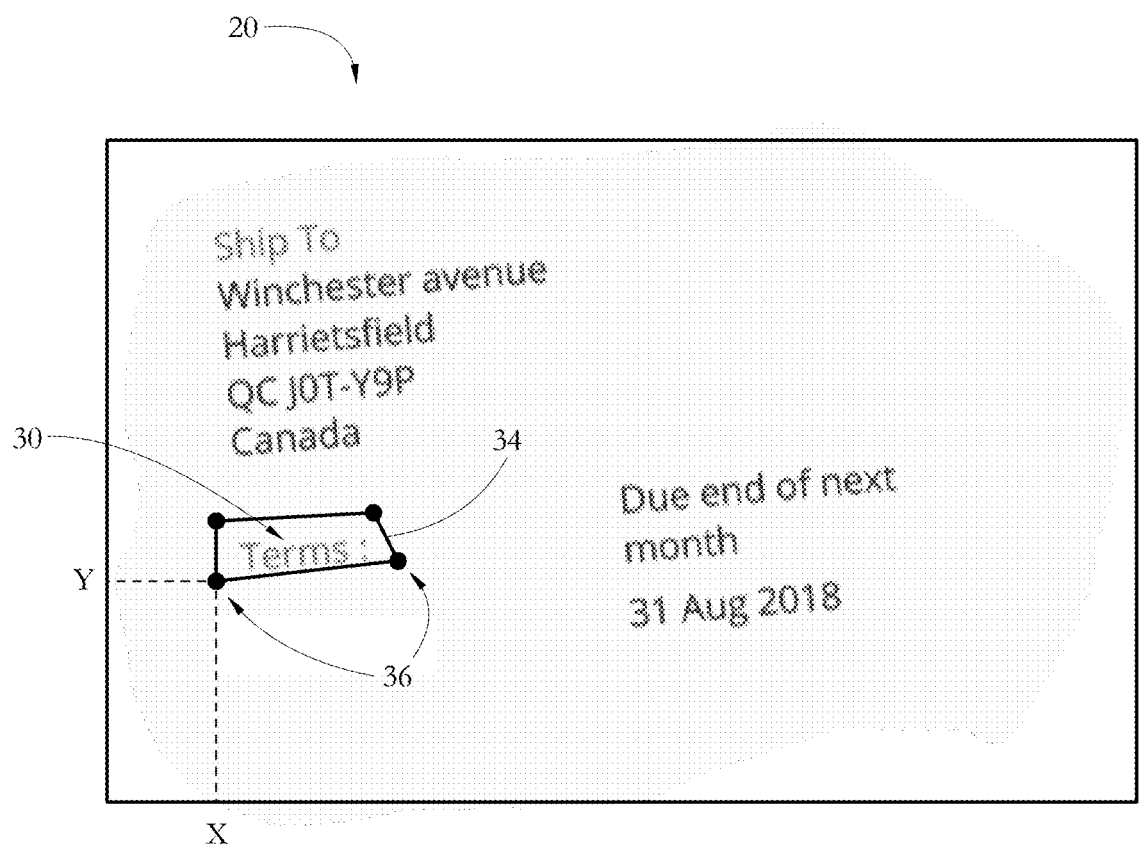
FIG. 5 shows an exemplary token bounding box according to some embodiments of the present invention.

In some embodiments, data scraping engine 40 includes an optical character recognition (OCR) engine 42 configured to receive document image 20 and to extract a set of text tokens 30 from image 20. One exemplary OCR engine 42 detects individual text characters within document image 20 and concatenates the respective characters into text tokens according to pre-determined token segmentation rules. Some embodiments of OCR engine 42 further output a token box indicator 31 comprising an encoding of a bounding box calculated for each detected text token. A token bounding box is herein defined as a geometric shape fully enclosing a region of document image 20 containing text token 30, i.e., all pixels belonging to the respective text token are inside the token bounding box. An exemplary bounding box is a convex hull of the set of pixels encoding an image of the text token. Another exemplary token bounding box is a convex polygon (e.g., rectangle) characterized by its vertices being chosen in a manner in which all image pixels of the respective text token are inside the respective polygon. FIG. 5 shows an exemplary token 30 and its associated bounding box 34. Token box indicator 31 may comprise a set of coordinates of vertices of bounding box 34, ordered according to a pre-determined rule (for instance, counter-clockwise, starting with the lower-left vertex). Vertex coordinates X and Y may be expressed in image pixels or may be determined as a fraction of the image size along the respective direction (e.g., for an image 800 pixels wide, a coordinate X=0.1 may indicate a position located 80 pixels from the left edge of image 20). In an alternative embodiment, bounding box 34 may be specified as a tuple {X, Y, w, h}, wherein X and Y denote coordinates of a vertex 36, and w and h denote a width and a height of box 34, respectively.

In some embodiments, data scraping engine 40 further includes a line segmentation engine 48 connected to OCR engine 42. Line segmentation engine 48 is configured to receive token bounding box data and to output a token ordering indicator 35 indicative of an order in which token embedding vectors are presented to a token classifier (described in detail below). An exemplary token ordering indicator 35 includes a numerical label attached to each text token, the respective label indicating a position of the respective token in an ordered sequence of text tokens.

Some embodiments rely on the observation that human readers are culturally conditioned to read information off a printed page in a specific order. For Western cultures, the typical order is left-to-right, top-to-bottom. Some languages such as Arabic and Hebrew favor a right-to-left reading order. In Japanese, text lines may be either horizontal or vertical. Printed documents, invoices and receipts included, are typically formatted to reflect such preference. Since some embodiments employ natural language processing methods, and since such methods typically consider each text token/word in the context of multiple other tokens/ words, feeding tokens into a classifier in the order they are meant to be read on paper may improve the performance of the respective classifier.

To determine an ordering of text tokens, some embodiments of line segmentation engine 48 attempt to arrange text tokens 30 of the target document into separate text lines, as if the respective document were a section of plain text, such as a book paragraph. This process is herein called line segmentation. The document may then be linearized by concatenating the resulting text lines, to produce a single token sequence containing all text tokens. To aid with line segmentation, some embodiments pre-process document image 20 by automatically rotating it to remove the occasional rotational bias. The orientation of text lines may be determined according to a language of the analyzed document. For languages using the Latin alphabet (e.g., English, Spanish, Turkish, etc.) tokens are arranged in substantially horizontal lines, i.e., lines having an angle of much less than 45 degrees with respect to the bottom of the image. In such cases, within each line, tokens are ordered from left to right, and the succession of lines is from top to bottom. For languages such as Arabic or Hebrew, tokens may be ordered from right to left within each line. For languages such as Japanese, some embodiments may arrange text tokens into substantially vertical lines, i.e., lines having an angle very close to 90 degrees with respect to the bottom of the image. Within each such vertical line, tokens may be ordered from top to bottom; the succession of lines may be from right to left.

Figure 6:
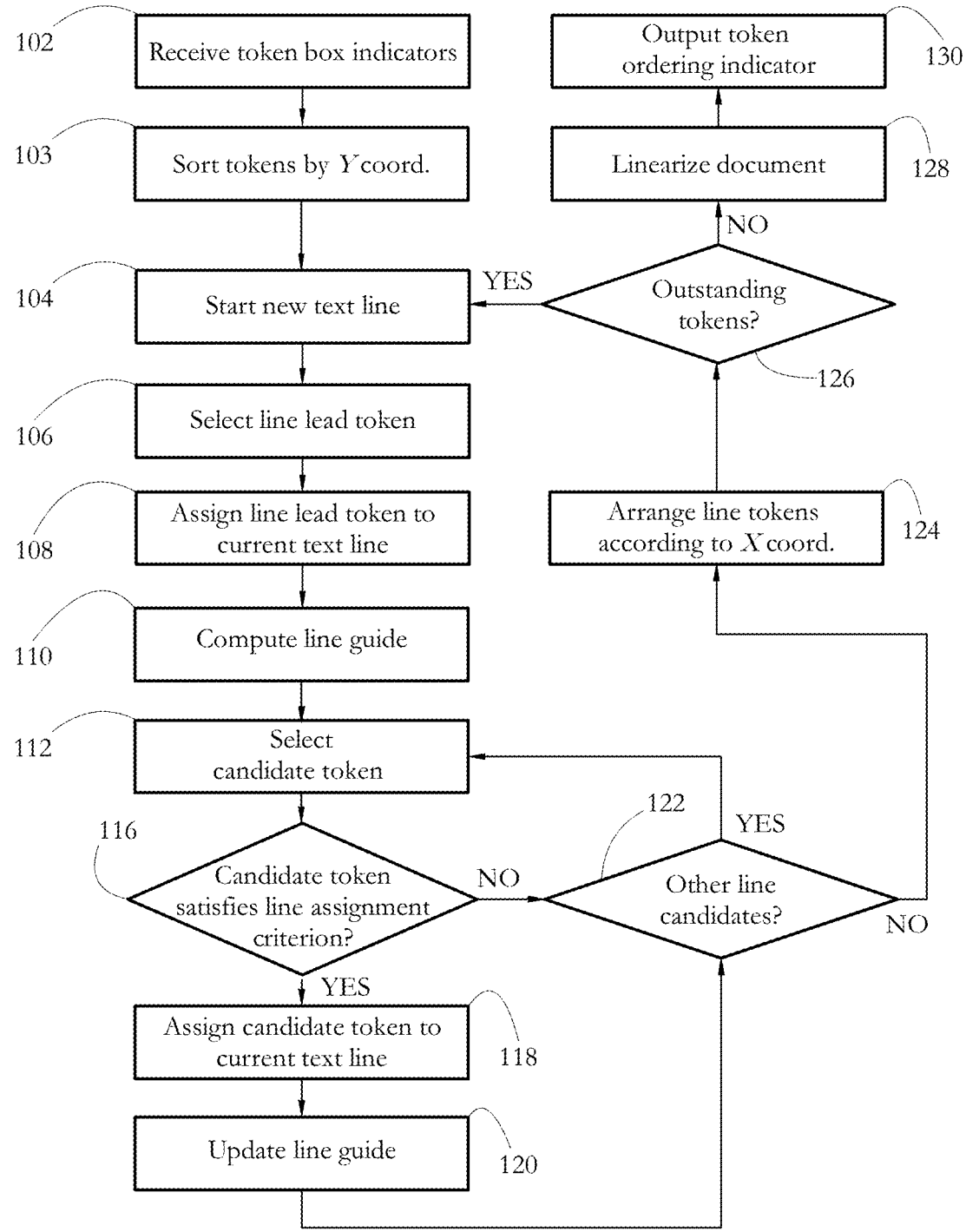
FIG. 6 shows an exemplary sequence of steps performed by a line segmentation engine according to some embodiments of the present invention.

FIG. 6 shows an exemplary sequence of steps performed by line segmentation engine 48 according to some embodiments of the present invention. In response to receiving token box indicators 31 from OCR engine 42, a step 103 sorts text tokens according to a position of each bounding box along the Y coordinate, to produce a sorted list of tokens. The position may be calculated according to the Y coordinate of one of the vertices of the bounding box, according to an average Y coordinate of the vertices, etc. A step 104 then initializes a new text line. A further sequence of steps 106-108 selects a text token which is currently not assigned to any line as the lead token (i.e., first token on the respective line), and assigns the token to the current text line. The selection may be made according to a position of the respective text token, e.g., the token that is closest to the top left corner of document image 20, for a language using the Latin alphabet. The position of a text token may be determined according to its vertex coordinates as specified by the token box indicator of the respective text token.

Figure 7:
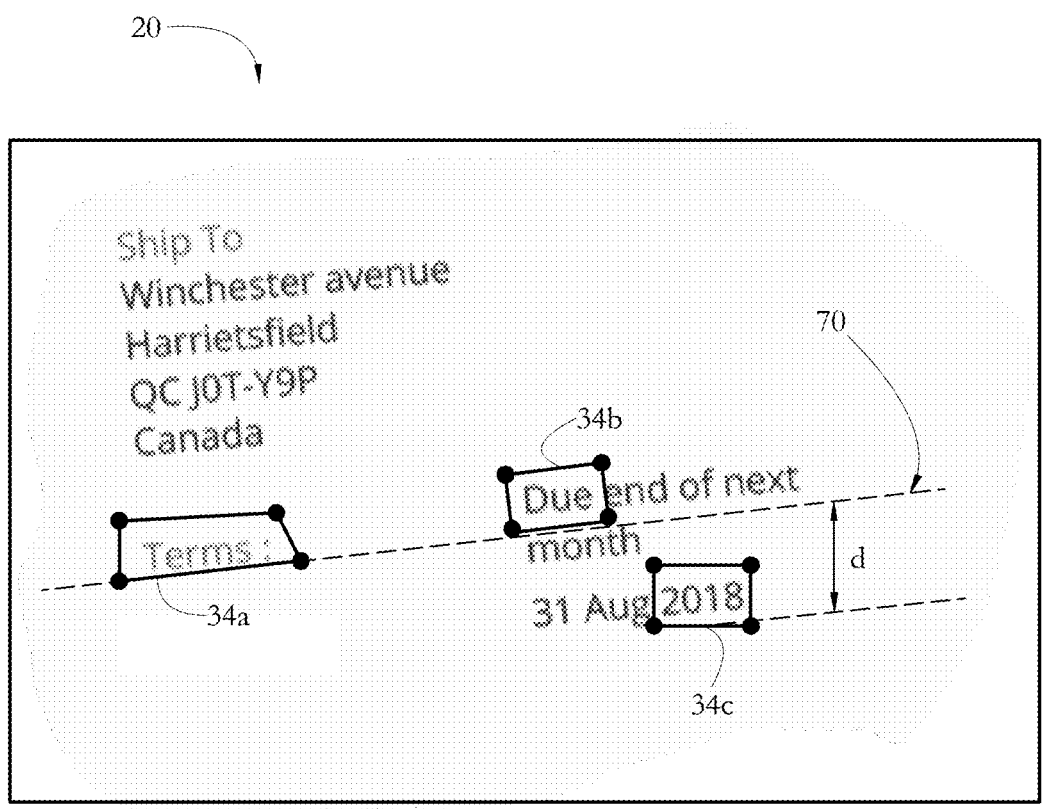
FIG. 7 illustrates an exemplary line segmentation process according to some embodiments of the present invention.

In a step 110, engine 48 may determine a line guide of the current text line, the line guide comprising a straight line whose equation is determined according to the vertex coordinates of the bounding box of the latest text token assigned to the current line. FIG. 7 illustrates such a line guide 70 calculated according to bounding box 34a. In some embodiments, line guide 70 is determined according to the coordinates of the two ends of a bottom side of the bounding box of the respective text token. For instance, line guide 70 may be determined so that it passes through the ends of the bottom side of bounding box 34a, as illustrated in FIG. 7. In an embodiment configured to analyze documents wherein text lines are vertical, line guide 70 may be calculated according to coordinates of the two ends of a right-hand side of the bounding box of the respective text token, for instance as a straight line passing through the two ends of the right hand side of the respective bounding box.

In a further step 112, engine 48 may search for a candidate token to be added to the current text line. In some embodiments, the search comprises walking the sorted list of text tokens determined in step 103. When a candidate token has been selected, a step 116 checks whether the candidate token verifies a line assignment criterion, and when no, engine 48 may proceed to a step 122 to try another candidate token. In some embodiments, step 116 comprises determining a distance between the line guide and the bounding box of the candidate token and determining whether the candidate token satisfies the line assignment criterion according to the calculated distance. In one example illustrated in FIG. 7, engine 48 computes a distance d between line guide 70 and a bottom edge of bounding box 34c (e.g., one of the end-vertices of the bottom edge, or the midpoint of the bottom edge). To expedite calculations, some embodiments calculate d as the vertical distance, i.e., only along the Y coordinate of image 20. In an embodiment wherein text lines are vertical, the respective distance may be calculated along the X coordinate of the image.

Some embodiments compare the distance to a threshold, which may be determined according to a size of a character (e.g., font size) of the candidate token and/or according to a size of a character of the latest token to be assigned to the current line. Tokens having a distance to the line guide smaller than the respective threshold may be considered to satisfy the line assignment condition. When the candidate token satisfies the line assignment condition, in a step 118 engine 48 assigns the candidate token to the current line. A further step 120 recomputes the line guide of the current text line, to reflect the addition of a new text token. In some embodiments, the updated line guide is determined exclusively according to coordinates of the bounding box of the newly assigned text token, e.g., as the straight line passing through the end vertices of a bottom side of the bounding box of the respective token. An alternative embodiment updates the line guide according to the newly assigned token and also according to other text tokens already assigned to the same text line. In one such example, line segmentation engine 48 calculates the updated line guide according to a linear interpolation of vertex coordinates of bounding boxes of multiple text tokens assigned to the current text line. Such interpolation may make line segmentation more robust and more precise in cases where the target document was crumpled or folded, or where document image 20 is otherwise warped as in the case of camera lens distortion. A skilled artisan will understand that the linear interpolation described herein is not meant to be limiting; other interpolating curves may be used instead of a straight line.

In response to updating the line guide, in a step 122 engine 48 determines whether there are any other tokens that may be candidates for assignment to the current text line. When yes, a new candidate token is selected and checked whether it fulfills the line assignment criterion. When step 122 can find no more token candidates, indicating that the current text line has ended, a step 124 may re-arrange tokens assigned to the respective line according to their X coordinate. The ordering within each line may be chosen according to the natural language of the respective document.

A step 126 may check whether there are still tokens that are not assigned to any text line. When yes, engine 48 returns to step 104 to initialize a new text line. When no, a step 128 linearizes the document by concatenating all text lines to produce a single token sequence. An indicator if the resulting ordered token sequence is the returned as token ordering indicator 35 (step 130).

Figure 8:
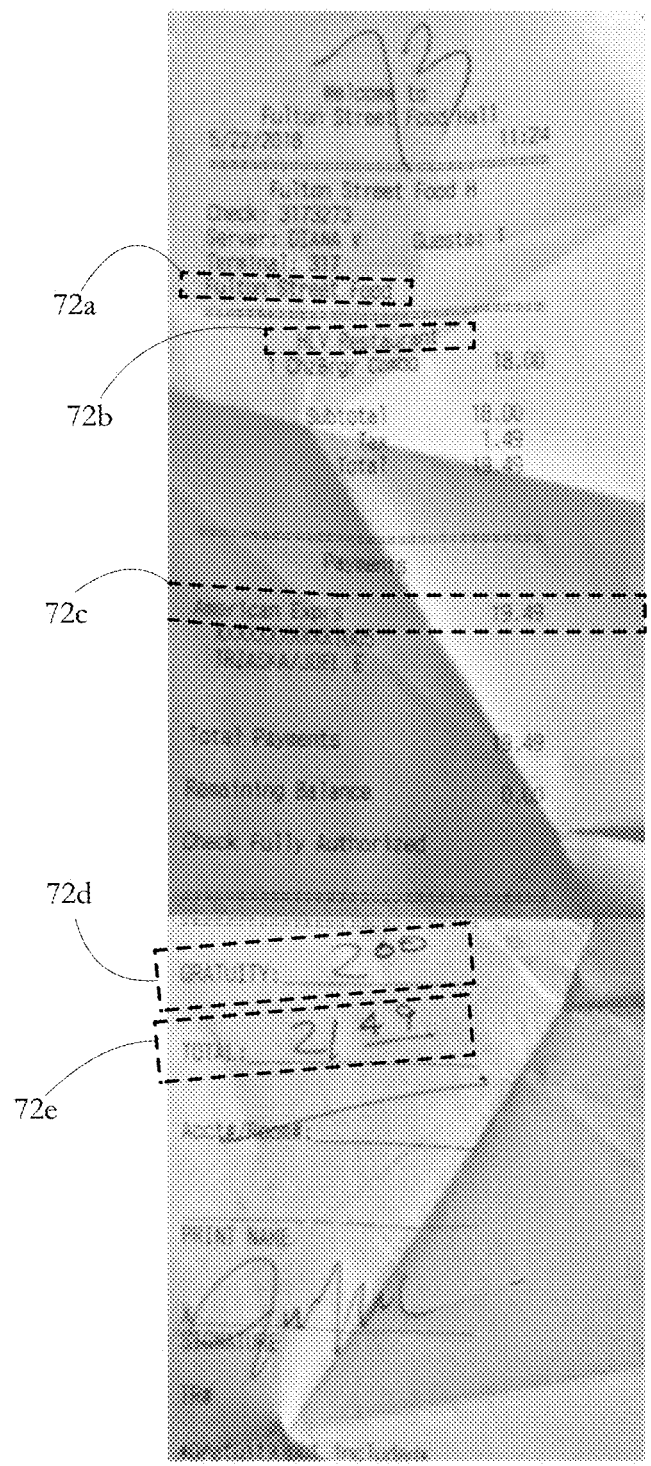
FIG. 8 shows an exemplary result of line segmentation according to some embodiments of the present invention.

FIG. 8 shows a result of line segmentation performed on a receipt according to some embodiments of the present invention. The figure shows multiple text lines 72a-e, and further shows that some embodiments are capable of correctly identifying text lines even in cases where document image 20 is deformed due to folding or crumpling of the paper document. Also noteworthy is the fact that not all text lines have the same tilt with respect to the image. Some text lines are not straight but follow the occasional folds of the paper document.

In some embodiments, data scraping engine 40 (FIG. 4) further includes a set of feature extractors configured to determine, for each text token, a token embedding vector 60 comprising 1-dimensional array of numbers amounting to a representation of the respective text token in an abstract coordinate space commonly known in the art of machine learning as an embedding space. An exemplary embedding space is spanned by a set of axes, wherein each axis represents a distinct token feature. In another example, each axis of the embedding space corresponds to a linear combination of event features (for instance, in a principal component/singular value decomposition embodiment). Each element of the embedding vector represents a coordinate of the text token along a respective axis of the embedding space.

In some embodiments of the present invention, token embedding vector 60 comprises at least two parts: a text feature vector 62 and an image feature vector 64, wherein the former characterizes text token 30 from a textual/linguistic perspective (i.e., as a sequence of characters/word formulated in a natural language), while the latter characterizes text token 30 from the perspective of the image of the respective text token, e.g., according to a region of document image 20 located within a bounding box of the respective token. In a preferred embodiment, text feature vector 62 consists of a first plurality of numbers, each of which characterizes the whole text token 30, i.e., collectively characterizes all token characters as opposed to individual token characters. Similarly, in a preferred embodiment, image embedding 64 consists of a second plurality of numbers, each of which characterizes an image of the whole text token 30, i.e., collectively characterizes all token pixels, as opposed to individual pixels or images of individual characters of the respective text token.

Figure 9:
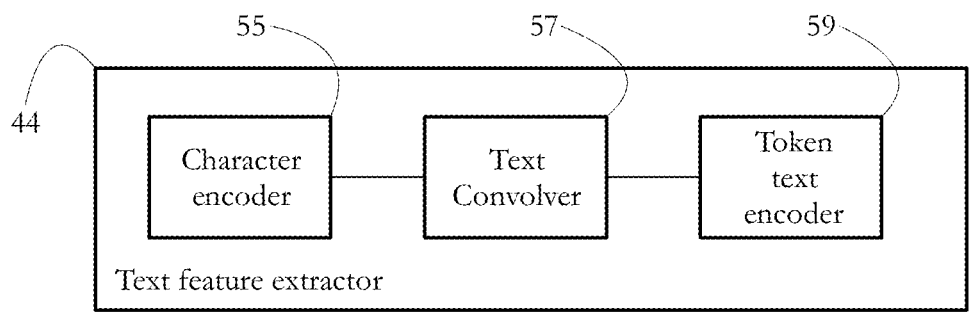
FIG. 9 illustrates exemplary components of a text feature extractor according to some embodiments of the present invention.
Figure 10:
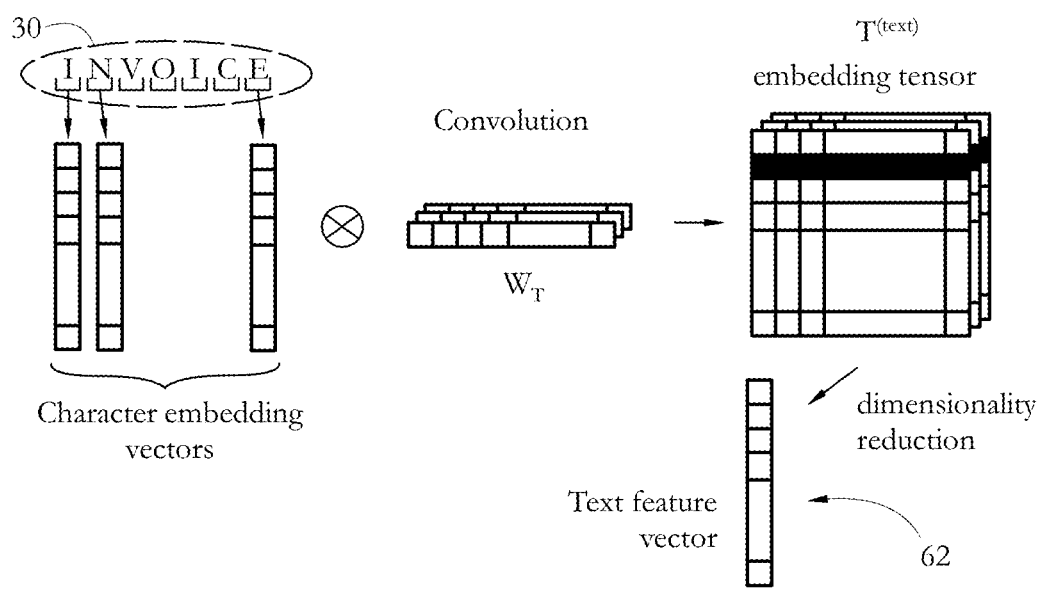
FIG. 10 illustrates the operation of an exemplary text feature extractor according to some embodiments of the present invention.

In the exemplary configuration of FIG. 4, a text feature extractor 44 receives text token 30 from OCR engine 42 and outputs text feature vector 62 characterizing text token 30. FIG. 9 shows exemplary components of text feature extractor 44 according to some embodiments of the present invention. FIG. 10 further illustrates the operation of extractor 44.

In some embodiments, text token 30 is first analyzed at a granularity of individual characters. Character-specific features are then lumped together to produce values which characterize text token 30 as a whole. In one such example, a character encoder 55 is configured to input text token 30 and to output a set of character embedding vectors, each such vector corresponding to an individual character of token 30 (see FIG. 10). In practical applications, the typical size of a character embedding vector is between 10 and 100 (an exemplary character embedding vector has 16 elements). Character encoder 55 may comprise an artificial multilayer neural network, configured to receive a one-hot or character ID representation of each character, and to produce a corresponding character embedding vector. Internal parameters of encoder 55 (for instance a set of neural network synapse weights) may be adjusted via a training process. More details on the training procedure will be given further below.

Text feature extractor 44 may further comprise a text convolver 57 which may be structured as a convolutional neural network. In one example illustrated in FIG. 10, convolver 57 is configured to transform the set of character embedding vectors representing individual characters of token 30 into an embedding tensor (in this case a 3-dimensional matrix of numbers) via convolution with a set of filters. In some embodiments, individual character embedding vectors are assembled into a matrix wherein each vector is a column and columns are ordered according to the order of individual characters within text token 30. In some embodiments, convolution filters are 1-dimensional vectors of numbers $\{w_T\}$; these numbers may be adjusted in a training procedure.

Convolution itself amounts to performing multiple dot products between elements of the character embedding matrix and each convolution filter. In the illustration of FIG. 10, each filter produces a distinct 2-dimensional slice of the embedding tensor; such slices are stacked in the order of application of the convolution filters. Within each slice, each element of the embedding tensor $T^{(text)}_{ij}$ has contributions from the character embedding vector of character j, but also contributions from adjacent characters at positions j−1, j+1, etc. within the respective text token. The embedding tensor therefore collectively represents text token 30 at a granularity that is coarser than that of individual characters.

In some embodiments, text convolution filters have a limited receptive field of size r, i.e., all filter elements are zero with the exception of r adjacent elements. When such a filter is applied to a character embedding matrix as illustrated in FIG. 10, each element of the respective slice of the embedding tensor contains contributions from r adjacent characters of text token 30. In some embodiments, the receptive field width r varies among convolution filters (e.g., r typically varies between 2 and 10, and may depend of the respective language).

Text feature extractor 44 (FIG. 9) may further include a token text encoder 59 configured to receive an output of text convolver 57 and to return text feature vector 62 of the respective text token 30. In some embodiments, token text encoder 59 comprises an artificial neural network including a pooling layer that performs a dimensionality reduction of the embedding tensor, collapsing it into a 1-dimensional text feature vector as shown in FIG. 10. Pooling may proceed according to any method known in the art of machine learning. In one example implementing a MaxPool procedure, token text encoder 59 may replace each value $T^{(text)}_{ij}$ of the embedding tensor with the maximum $T^{(text)}_{ij}$ value within the respective row:

$$T_{ij}^{(text)} \rightarrow \max_j T_{ij}^{(text)} \qquad [1]$$

Some embodiments further apply a MaxPool procedure across different convolution filters:

$$T_{ikj}^{(text)} \rightarrow \max_{jk} T_{ijk}^{(text)}, \qquad [2]$$

wherein k indexes distinct slices of the embedding tensor. Alternative embodiments may use an average pooling procedure, wherein a value of the embedding tensor is replaced by an average of values within the same row and/or slice. For instance:

$$T_{ijk}^{(text)} \rightarrow \text{avg}_{jk} T_{ijk}^{(text)} \qquad [3]$$

In yet another example, token text encoder 59 may apply a mixed pooling procedure that uses max pooling along one direction and average pooling along another. For instance:

$$T_{ijk}^{(text)} \rightarrow \text{avg}_k \max_j T_{ijk}^{(text)} \qquad [4]$$

In some embodiments, text feature extractor 44 is trained to produce a text feature vector 62 indicative of a field type of the respective text token 30. In one such example, text embedding 62 comprises a subset of elements, each elements of the subset indicative of a likelihood that text token 30 belongs to a distinct field type (e.g., "Billing address", "Subtotal", etc.). In such embodiments, token text encoder 59 may further comprise a classifier neural network, for instance a fully connected layer coupled to a rectified linear unit (ReLU) and/or a loss layer.

Application of token text encoder 59 (i.e., the pooling or other dimensionality reduction procedures) further results in each element of text feature vector 62 characterizing text token 30 as a whole, as opposed to individual characters of token 30.

The text feature extractor embodiments described above rely on vector representations of individual characters to derive text embedding 62. An alternative embodiment of text feature extractor 44 may use an entirely different approach that directly computes a text feature vector of text token 30 as a whole, without resorting to representations of individual characters. Such alternative embodiments may employ a modified version of a word2vec or a GloVe embedding, adapted to analyzing accounting documents. One such example characterizes each token according to a context of other tokens, which precede and/or follow the respective token. A token sequence may comprise a central text token $T_0$ and a token context consisting of a subset of text tokens $T_{-m} \ldots T_{-1}$ (m≥0) preceding the central token and/or a subset of text tokens $T_1 \ldots T_p$ (p≥0) following the central text token. Typical embodiments use a symmetric token context (p=m), with p in the range of 2 to 5. The token sequence may be provided by line segmentation engine 48 as shown above.

Text feature extractor 44 may maintain a token vocabulary of N distinct text tokens (e.g., words) found in a corpus of text formulated in the natural language of the target document. The token vocabulary may be collected specifically from a corpus of accounting documents such as invoices and/or receipts—such a vocabulary may more faithfully approximate the language typically used in accounting documents. The size N of the token vocabulary may be of the order of several thousand distinct text tokens (e.g., some embodiments use N≈30,000). The size of text feature vector 62 may be determined according to a size of the token vocabulary N, for instance, of the order of the quadratic root of N, or of a logarithm of N. A typical embodiment of the present invention uses text feature vectors of length 512.

In such embodiments, text feature extractor 44 may comprise a multilayer artificial neural network trained to represent each text token as a vector in an embedding space of contexts, wherein two tokens that occur predominantly in similar token contexts are located relatively close together. Training feature extractor 44 may comprise adjusting a set of parameters (e.g., synapse weights) using a backpropagation algorithm. More details on such training are given further below.

The character-based and token-based text embedding procedures described above are not inherently mutually exclusive. Various embodiments may use any of the two procedures, or even a combination of the two. In an exemplary combination embodiment, a first part of text feature vector 62 may be calculated using the character-based embedding procedure described in relation to FIGS. 9-10, while a second part of vector 62 may be calculated according to a word2vec/Glove embedding as described above.

Figure 11:
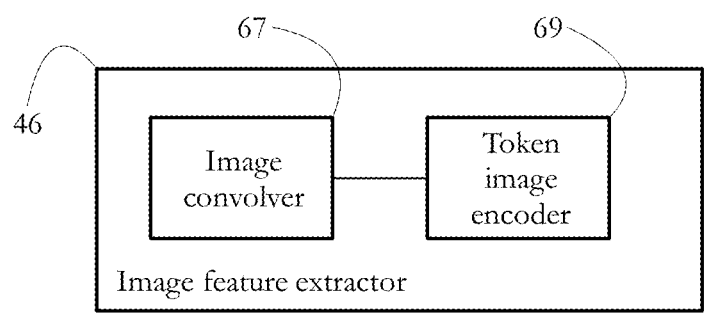
FIG. 11 shows exemplary components of an image feature extractor according to some embodiments of the present invention.
Figure 12:
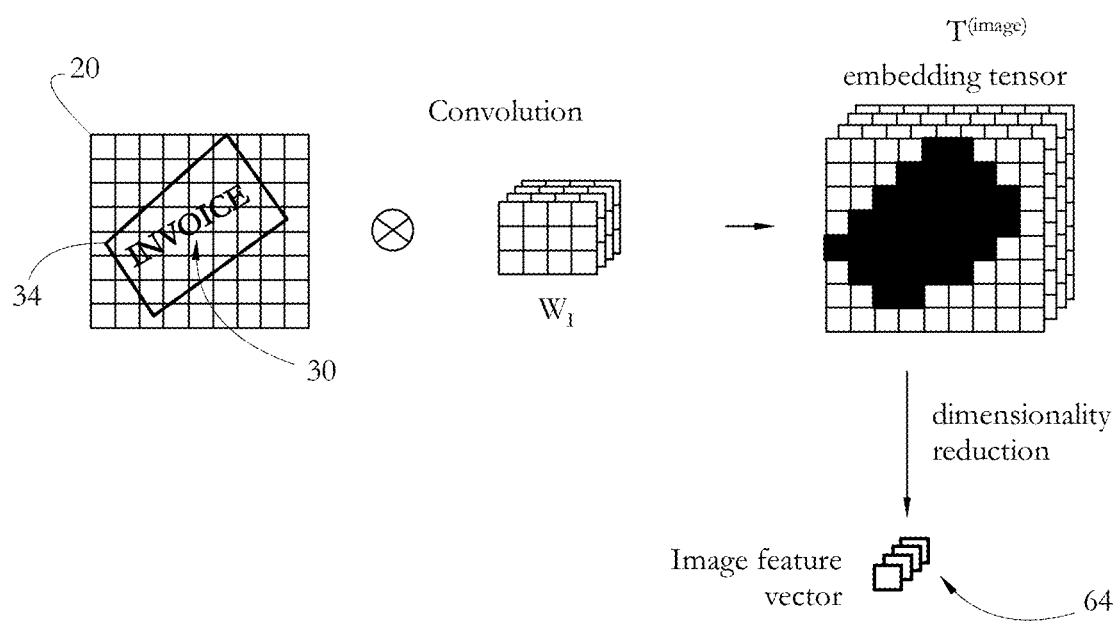
FIG. 12 illustrates the operation of an exemplary image feature extractor according to some embodiments of the present invention.

In the exemplary configuration of FIG. 4, an image feature extractor 46 receives document image 20 and token box indicator 31 from OCR engine 42 and outputs image feature vector 64 characterizing text token 30. FIG. 11 shows exemplary components of image feature extractor 46 according to some embodiments of the present invention. FIG. 12 further illustrates the operation of extractor 46.

Image feature extractor 46 may comprise an image convolver 67 which may be structured as a convolutional neural network configured to transform document image 20 into an image embedding tensor via convolution with a set of image filters. In some embodiments, image convolution filters are 2-dimensional matrices of numbers $\{w_I\}$; these numbers may be adjusted in a training procedure.

In the illustration of FIG. 12, each image filter produces a distinct 2-dimensional slice of the image embedding tensor; such slices are stacked in the order of application of the convolution filters. Within each slice, each element of the embedding tensor $T^{(image)}_{ij}$ has contributions from pixel ij, but also contributions from other adjacent pixels.

Image feature extractor 46 may further include a token image encoder 69 configured to receive an output of image convolver 67 and to return image feature vector 64 of the respective text token 30. In some embodiments, token image encoder 69 comprises an artificial neural network including a pooling layer that performs a dimensionality reduction of the image embedding tensor, collapsing it into a 1-dimensional image feature vector as shown in FIG. 12. Pooling may employ a MaxPool procedure, wherein each value $T^{image)}_{ij}$ of the embedding tensor si replaced with the maximum $T^{(image)}_{ij}$ value within bounding box 34:

$$T_{ijk}^{(image)} \rightarrow \max_{(i,j)\, box} T_{ijk}^{(image)}, \qquad [5]$$

resulting a one-dimensional image embedding 64 wherein each element corresponds to a distinct image convolution filter. A further dimensionality reduction may be achieved by applying another pooling procedure among different image filters, for instance by averaging the image tensor slices corresponding to a subset of image filters.

The pooling or other dimensionality reduction procedures involved in application of token image encoder 69 results in each element of image embedding 64 characterizing an image of the whole text token 30, as opposed to individual pixels or images of individual characters of the respective text token.

In some embodiments, image feature extractor 46 is trained to produce an image feature vector 64 indicative of a field type of the respective text token 30. In one such example, vector 64 comprises a subset of elements, each element of the subset indicative of a likelihood that text token 30 belongs to a distinct field type (e.g., "Billing address", "Company name", "Total due", etc.). In such embodiments, token image encoder 69 may further comprise a classifier neural network, for instance a fully connected layer coupled to a rectified linear unit (ReLU) and/or a loss layer, all configured and trained to determine the respective field type.

As shown above in relation to FIG. 4, text feature vector 62 and image feature vector 64 may be combined to produce token embedding vector 60 calculated for text token 30. In some embodiments, token embedding vector 60 further comprises other token features, such as an indicator of a position of token 30 within document image 20, an indicator of whether text token 30 contains specific special characters (e.g., $, %), an indicator of whether token 30 contains any numbers, etc. Such features may be extracted using plain text parsers.

Data scraping engine 40 (FIG. 4) further comprises a token classifier 50 connected to feature extractors 44 and 46 and to line segmentation engine 48. In some embodiments, token classifier 50 is configured to receive a sequence of token embedding vectors 60 ordered according to token ordering indicator 35, and to output a set of field-type assignment indicators 54 (e.g. class labels) indicating a likely field type of each text token 30. Exemplary field-type indicators 54 comprise a one-hot encoded vector of values, wherein the non-zero element indicates a field type that the respective token is most likely to belong to. Another exemplary field-type indicator 54 comprises a vector of values, each one indicating a likelihood (e.g., probability) that the respective token belongs to a particular field type. In a preferred embodiment, feature vectors 60 are presented to classifier 50 in an order characteristic of a natural reading order for the respective natural language and script (e.g., for most Western languages, each text line is read from left to right, and successive lines are read from top to bottom).

Token classifier 50 may be constructed according to any architecture known in the art of machine learning. In a preferred embodiment of the present invention, classifier 50 includes a recurrent neural network (RNN) connected to a fully connected layer and further connected to ReLU and/or loss layers. The RNN may be implemented using a bi-directional long short term memory (LSTM) architecture or graph neural net (GNN) architecture. In one such example, the RNN comprises multiple stacked LSTM networks (e.g., 2-4 layers). The RNN may receive token embedding vectors and output a prediction to the fully connected layer, which in turn computes the class assignment/field-type of each text token.

Some embodiments of data scraping engine 40 further comprise a post-processing engine 52 configured to receive class labels/field-type indicators for each text token and to formulate and output document content indicator 22. Engine 22 may perform various tasks such as removing currency symbols from numeric tokens, re-formatting dates, spell-checking, etc. Engine 52 may further assemble text tokens into fields. In one such example, post-processing engine 52 may determine whether neighboring text tokens have the same field assignment. Such a situation may indicate that the respective tokens are part of a larger field of the specified field type (see description above in relation to FIGS. 3-A-B). When yes, some embodiments may concatenate the respective text tokens to produce a field, and label the respective field with the appropriate field type indicated by the respective token field-type indicators 54. Engine 52 may further formulate document content indicator 22 according to a pre-determined data specification (e.g., XML, JSON, etc.).

Figure 13:
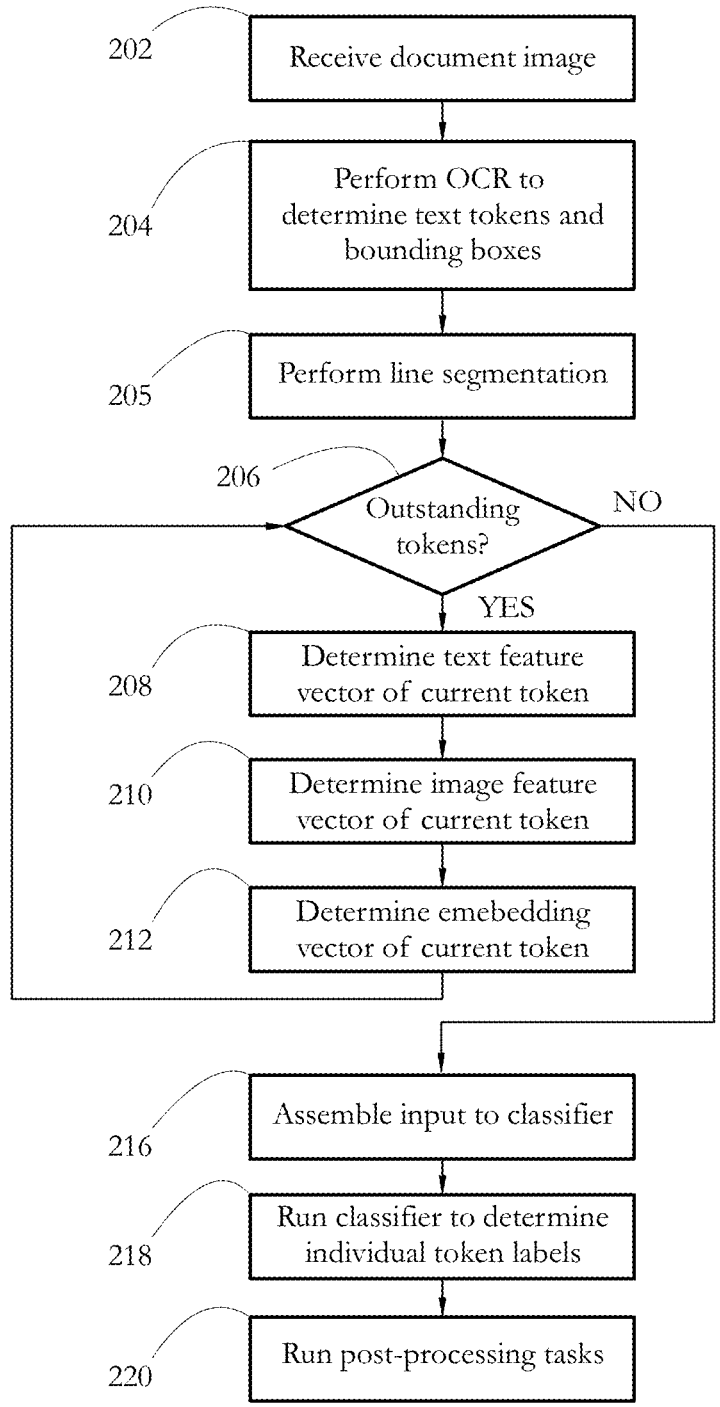
FIG. 13 shows an exemplary sequence of steps performed by the data scraper engine according to some embodiments of the present invention.

FIG. 13 shows an exemplary sequence of steps performed by data scraper engine 40 according to some embodiments of the present invention. A skilled artisan will understand that the illustrated method steps need not be executed in the order shown. Also, since activities such as line segmentation and determining feature vectors are independent of each other, they can be carried out in a parallel computing configuration, for instance on separate machines or on separate processor cores of the same machine. Similarly, within each illustrated component, some operations such as convolutions and dimensionality reduction may be parallelizable and as such, they may be performed out of order and/or on distinct processors.

In response to receiving document image 20, a step 204 executes OCR engine 42 to produce individual text tokens 30 and associated bounding boxes 34. In an alternative embodiment, scraper engine 40 does not include OCR engine 42, and instead receives pre-calculated text tokens 30 and box indicators 31 from outside. In a step 205, line segmentation engine 48 calculates an order in which to present embedding vectors to token classifier 50.

A sequence of steps 206-208-210-212 executes feature extractors 44 and 46 to determine token embedding vectors 60 for each text token 30 in image 20. A step 216 assembles the input to classifier 50, for instance by arranging token feature vectors 60 in sequence using the ordering indicated by line segmentation engine 48.

A further step 218 executes token classifier 50 to produce a field-type indicator for each presented token 30. In a step 220, post-processing engine 52 performs cleanup tasks and formulates document content indicator 22 for transmission to client system 10 (see FIG. 2).

In preparation for using data scraping engine 40 to automatically extract data from document images as shown above, some embodiments undergo a process of training. Training herein denotes a process of adjusting parameters of various components of data scraping engine 40 with the aim of improving its data extraction performance. Training comprises assembling a training corpus of document images (e.g., images of invoices and/or receipts). Each training document image may be pre-processed under supervision of a human operator. Such pre-processing may include, among others, applying OCR to identify individual text tokens and respective bounding boxes, indicating a line segmentation and/or an order of presenting text tokens to classifier 50, and indicating a correct field-type indicator/class label to each text token in the training document image.

Figure 14:
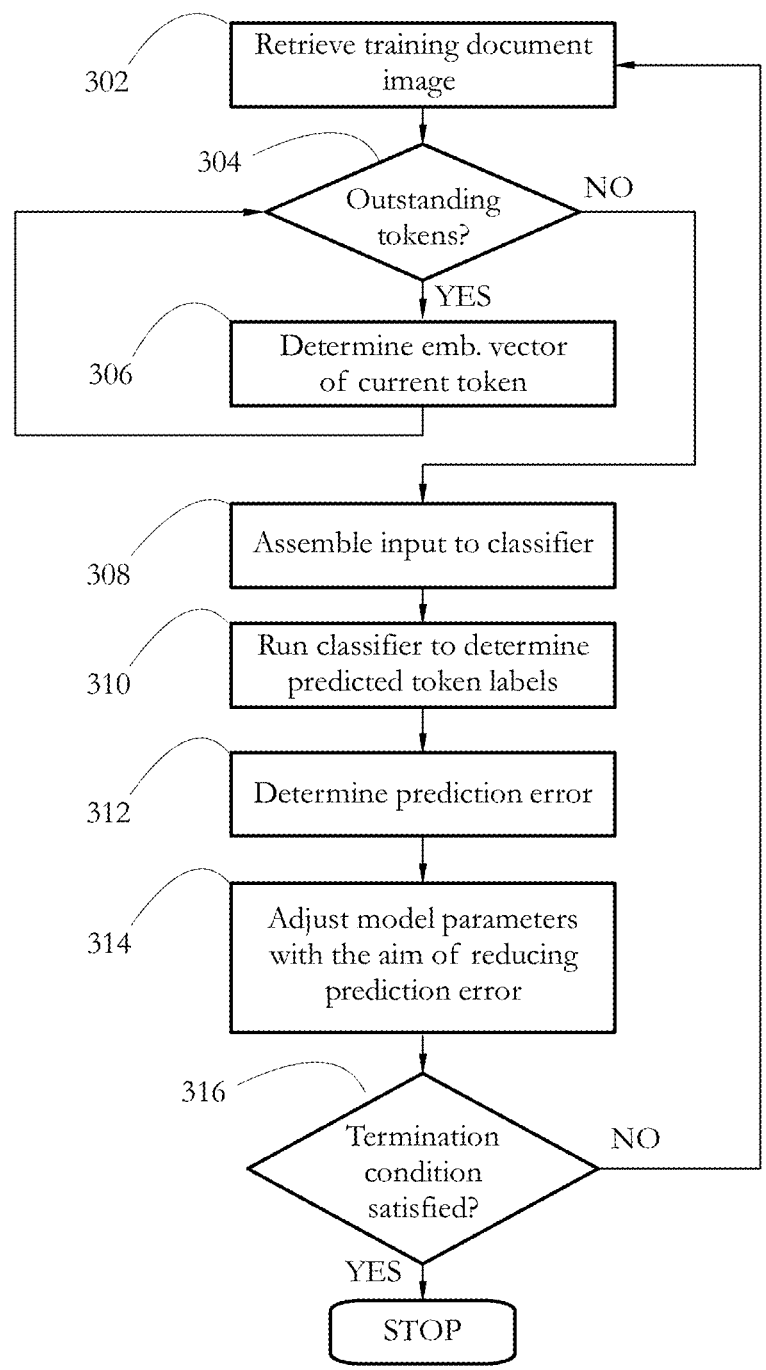
FIG. 14 illustrates an exemplary training procedure according to some embodiments of the present invention.

Components such as feature extractors 44, 46, and classifier 50 may be trained separately and/or as a complete system. An exemplary sequence of steps illustrating a procedure for training data scraper engine 40 as a complete system is shown in FIG. 14. A step 302 selects a document image from the training corpus. For each text token within the document, a step 304 comprises executing feature extractors 44 and 46 to determine embedding vector 60 of the respective text token. A step 308 may then assemble the input to classifier 50, by arranging embedding vectors in the pre-determined order indicated by supervised line segmentation. A further step 310 executes token classifier 50 to determine a prediction or guess for the token label/field-type indicator of each text token.

A step 312 then compares each predicted token field type with the respective actual field type of the respective token, thus determining a numerical prediction error. The prediction error, which may be interpreted as a cost function or an objective function, may be calculated according to any method known in the art of artificial intelligence. Such calculations may comprise determining a distance, for instance a Levenshtein, Euclidean, or cosine distance between the predicted and actual token field types. Some embodiments determine an objective function according to a cross entropy measure. Next, a step 314 may adjust parameters of feature extractors 44 and/or 46 and/or token classifier 50 in the direction of minimizing the calculated prediction error. Adjustable parameters may include a set of neural network synapse weights and a set of convolution filter elements, among others. Some exemplary algorithms used for training include backpropagation using gradient descent, simulated annealing, and genetic algorithms, among others. Some embodiments then repeat steps 302-316 until a termination condition is satisfied, for instance until the average prediction error over the training corpus drops below a pre-determined threshold. In another embodiment, training proceeds for a pre-determined amount of time, or for a pre-determined count of iterations.

To train text feature extractors 44 and/or 46 separately from other components of data scraper engine 40, the respective feature extractor may be configured to output a field-type indicator for each received text token, i.e., a prediction/guess of the type of data that each text token represents. For implementation details, see description above in relation to feature extractors 44 and 46. Then, a procedure similar to the one illustrated in FIG. 14 may be employed to train each feature extractor, by comparing a predicted field type with the actual field type of each received text token, and adjusting internal parameters of the respective feature extractor with the aim of reducing the prediction error. Such parameter tuning may proceed according to a version of a backpropagation algorithm.

A special type of independent training applies to a text feature extractor 44 which uses a version of a word2vec or GloVe representation of each text token in a context of other tokens. Such text feature extractors may come pre-trained on a relatively large corpus of text. However, the respective training corpus may not be specific to the application at hand (i.e., extracting data from accounting documents). Therefore, some embodiments explicitly (re)train feature extractor 44 on a training corpus of accounting documents. Such an approach may have the disadvantage of a relatively small training corpus, however the resulting text embedding may be substantially more efficient for processing accounting documents as shown herein.

An exemplary procedure for training a text feature extractor that uses a word2vec/GloVe representation pairs feature extractor 44 with a decoder configured to predict a token context given the central token of a sequence. Alternatively, the decoder may be configured to output the central token of a token sequence given the token context of the respective sequence. Parameters of extractor 44 and of the decoder are then tuned with the aim of minimizing prediction error over the training corpus of accounting documents images. Such parameter tuning may proceed according to an appropriate version of a backpropagation algorithm.

Figure 15:
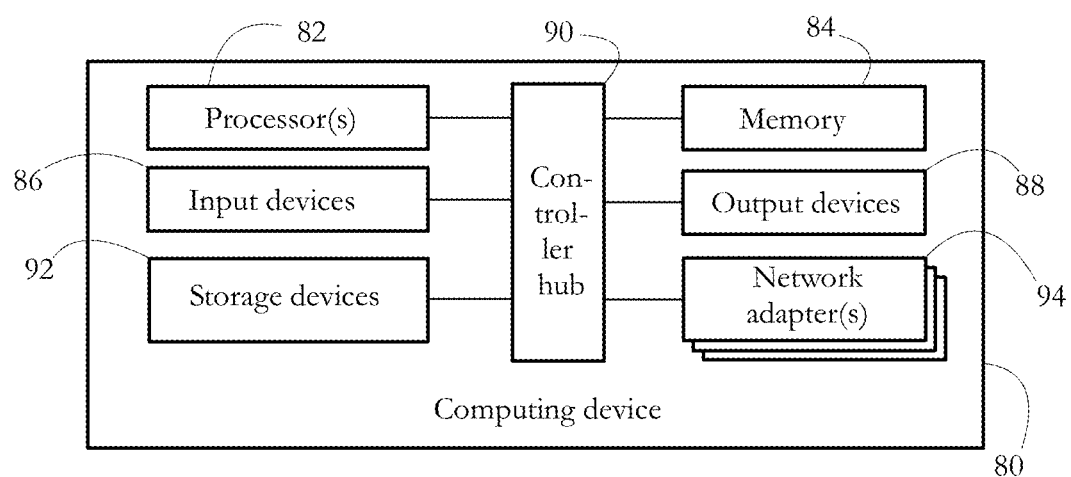
FIG. 15 illustrates an exemplary embodiment of a computer system configured to carry out methods described herein.

FIG. 15 shows an exemplary hardware configuration of a computing device 80 programmed to execute some of the methods described herein. Computing device 80 may represent an electronic appliance forming a part of document processing server 16, or any of client systems 10a-c in FIG. 1. For clarity, the illustrated client system is a computer system. Other client systems such as mobile telephones, tablet computers, and wearable devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 84 may comprise volatile computer-readable media (e.g. dynamic random-access memory—DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computing device 80. Output devices 88 may include display devices such as monitors and speakers among others, as well as hardware interfaces/adapters such as graphic cards, enabling the respective client system to communicate data to a user.

In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computing device 80 to connect to an electronic communication network (e.g., networks 14 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computing device 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above allow an efficient automatic scraping of structured data from document images. In one exemplary use-case scenario, a employee of an accounting department of a corporation uses a desktop computer to scan and send invoices to a document processing server executing some embodiment of the present invention. The server may reply with a structured content of the respective invoices, exported in a format which is preferred by the respective user (e.g., Microsoft Excel® file). In another exemplary use-case scenario, a smartphone executes a software application which allows a user of the respective device to keep track of his/her personal expenses. After lunch at his/her favorite restaurant, the respective user may take a photograph of the lunch receipt using the smartphone's built-in camera. The application may then transmit the photograph to the document processing server and receive a structured response identifying, among others, a name of the restaurant, a date, and a total amount paid.

Although the detailed description above has focused primarily on accounting/commercial documents such as invoices and receipts, the illustrated systems may be adapted with some modifications to extracting information from other documents such as ID cards, business cards, flyers, catalogs, etc.

In some embodiments, an OCR engine is used to extract a plurality of text tokens from a document image. Text tokens include sequences of characters (e.g., individual words, amounts, dates) bounded by certain delimiting characters. For each text token, the OCR engine further outputs the specifications of a bounding box enclosing an image of the respective text token within the document image.

Some embodiments employ machine learning technology to construct a classifier that automatically labels each text token with an indicator of a category of information that the respective token is likely to represent (e.g., an address, an item name, a payment due date, a total amount due/paid, etc.). The classifier is trained on a corpus of tagged documents.

Some conventional invoice/receipt processing systems use either natural language processing or image processing methods. In contrast to such systems, some embodiments combine textual information with image information in the classification of each text token. In some embodiments, the token classifier receives as input feature vectors having a first part determined according to a character content of the respective text token, and a second part determined according to an image (pixel content) of the respective text token. Furthermore, in contrast to conventional classifiers, in the computed feature vectors, both the textual information and the image information are encoded at a granularity of individual text tokens (e.g., words), as opposed to individual characters. Stated otherwise, the feature vector of a text token characterizes the text token as a whole.

Combining text and image representation may have substantial advantages over conventional approaches. While natural language processing methods may reveal a lot of information as to a field type of a text token, they mostly neglect the visual layout of the respective document. Image analysis as shown herein may bring in additional information, leading to an overall improvement in data extraction performance. One way image analysis may add relevant information is by way of convolution. When the perceptive field of the convolution filter is larger than the typical size of the token bounding box, convolution with the respective filter may pull in information about other items surrounding the respective text token. For instance, when the respective text token is next to a table line, the result of the convolution contains some of the image of the line, which may provide an additional hint to the classifier. In another example, image convolution may distinguish between a text token that is relatively isolated on the page (e.g., token 30e in FIG. 3-A) and another text token that is surrounded by other text or images (for instance, as in the case of a shipping address, see tokens 30a-b in FIG. 3-A). The image feature vector may contribute relevant, potentially label-indicative information to classifier 50.

Some embodiments further rely on the observation that although the layout of invoices and receipts may vary substantially, they are nevertheless printed documents formulated in a natural language and destined to be read by a human. As any other printed text, they are typically read in an order that is specific to the respective natural language and/or script. For instance, in languages using the Latin alphabet (e.g., English, Spanish, etc.) the reading order is top-to-bottom and left-to-right. Furthermore, the layout of a majority of accounting documents follows some general rules. For instance, the client and/or provider name are typically higher up on the page than the itemized list of purchases. Similarly, the total due/paid typically appears near the bottom of the page. Building on such observations, some embodiments use a token classifier that is sensitive to the order in which it receives tokens for classification (e.g., a recurrent neural network).

To capture some of the layout information, some embodiments linearize the content of the document images by segmenting it into individual text lines. Each line comprises an ordered sub-sequence of text tokens, wherein the ordering may reflect the natural reading order of the respective language (e.g., a token located to the left of another token may precede the latter in the token sequence). Adjacent text lines are then concatenated to produce an ordered sequence of tokens spanning the whole document. Some embodiments then present the tokens as input to the classifier in the specific order indicated by the sequence.

Linearizing the document as shown above may further improve automated classification by revealing certain patterns of information to the token classifier. Invoices and receipts typically include a section wherein multiple purchased goods are itemized, for instance as a table listing for each item an item name, quantity purchased, price per unit, and total price. In linearized form, the respective section comprises a sequence of text tokens wherein successive fields alternate in a repeating, predictable pattern (e.g., several tokens of type "item name" are followed by one token of type "quantity", followed by one token of type "price per unit", etc.). This kind of pattern is easily recognized by neural network classifiers.

However, performing line segmentation on documents of unknown layout presents substantial technical challenges. For instance, a text line may traverse fields having different font sizes. Paper documents are occasionally folded, crumpled, and annotated by hand, which results in document images which are warped or skewed. Some embodiments address such issues by using a line segmentation algorithm that constructs individual text lines in an incremental manner. In some embodiments, in response to adding a token to a text line, a line guide is constructed according to the bounding box of the newly added text token. A decision whether to add another token to the line is then taken according to a distance between a bounding box of the other token and the guide line. The algorithm is capable of generating both horizontal and vertical text lines.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:
   linearize a text content of a document image comprising an encoding of an image of a structured paper document, the structured paper document partitioned into a plurality of fields and having a plurality of text tokens distributed among the plurality of fields, each field of the plurality of fields having a distinct field type characterizing a distinct category of information represented by text tokens located within the each field, wherein linearizing the text content of the document image comprises:
      dividing the plurality of text tokens into a plurality of text lines of the structured paper document, and
      concatenating the plurality of text lines to form an ordered token sequence;
   assemble an ordered input according to an order of the ordered token sequence, the ordered input comprising, for each text token of the ordered token sequence, a feature vector characterizing a respective text token as a whole and determined according to a character content of the respective text token and further according to a pixel content of a region of the document image showing the respective text token; and
   feed the ordered input to a neural network configured to determine a field type of a field containing the respective text token according to the ordered input.

2. The method of claim 1, wherein constructing a text line of the plurality of text lines comprises:
   determining a line guide of the text line, the line guide comprising a line passing through a set of vertices of a bounding box of a text token belonging to the text line; and
   determining whether another text token of the plurality of text tokens belongs to the text line according to a distance between a bounding box of the other text token and the line guide.

3. The method of claim 2, further comprising, in response to determining whether the other text token belongs to the text line, when yes, updating the line guide according to a set of vertices of the bounding box of the other text token.

4. The method of claim 1, comprising ordering the token sequence according to a natural language that the structured paper document is formulated in.

5. The method of claim 1, wherein arranging the plurality of text tokens into the token sequence comprises:
   determining whether a first text token of the plurality of text tokens is located to the left of a second text token within the structured paper document; and
   in response, when yes, ordering the token sequence so that the first text token precedes the second text token within the ordered token sequence.

6. The method of claim 1, wherein arranging the plurality of text tokens into the token sequence comprises:
   determining whether a first text token of the plurality of text tokens is located closer to the top of the structured paper document than a second text token; and
   in response, when yes, ordering of the token sequence so that the first text token precedes the second text token within the ordered token sequence.

7. The method of claim 1, wherein the structured paper document comprises an item selected from a group consisting of an invoice and a receipt.

8. The method of claim 1, wherein the structured paper document is crumpled.

9. The method of claim 1, wherein the ordered token sequence spans the entire structured paper document.

10. The method of claim 1, wherein the neural network is configured to determine the field type according to the feature vector characterizing the respective text token, and further according to feature vectors characterizing other text tokens preceding and following the respective text token within the ordered token sequence.

11. A computing system comprising at least one hardware processor configured to execute a line segmentation engine and a token classifier connected to the line segmentation engine, wherein:
   the line segmentation engine is configured to linearize a text content of a document image comprising an encoding of an image of a structured paper document, the structured paper document partitioned into a plurality of fields and having a plurality of text tokens distributed among the plurality of fields, each field of the plurality of fields having a distinct field type characterizing a distinct category of information represented by text tokens located within the each field, wherein linearizing the text content of the document image comprises:
      dividing the plurality of text tokens into a plurality of text lines of the structured paper document, and
      concatenating the plurality of text lines to form the ordered token sequence; and
   the token classifier is configured to:
      assemble an ordered input according to an order of the ordered token sequence, the ordered input comprising, for each text token of the ordered token sequence, a feature vector characterizing a respective text token as a whole and determined according to a character content of the respective text token and further according to a pixel content of a region of the document image showing the respective text token, and
      feed the ordered input to a neural network configured to determine a field type of a field containing the respective text token according to the ordered input.

12. The computing system of claim 11, wherein constructing a text line of the plurality of text lines comprises:
   determining a line guide of a text line the line guide comprising a line passing through a set of vertices of a bounding box of a text token belonging to the text line; and
   determining whether another text token of the plurality of text tokens belongs to the text line according to a distance between a bounding box of the other text token and the line guide.

13. The computing system of claim 12, wherein constructing the text line further comprises, in response to determining whether the other text token belongs to the text line, when yes, updating the line guide according to a set of vertices of the bounding box of the other text token.

14. The computing system of claim 11, wherein arranging the plurality of text tokens into the token sequence comprises ordering the token sequence according to a natural language that the structured paper document is formulated in.

15. The computing system of claim 11, wherein arranging the plurality of text tokens into the token sequence comprises:
   determining whether a first text token of the plurality of text tokens is located to the left of a second text token within the structured paper document; and
   in response, when yes, ordering the token sequence so that the first text token precedes the second text token within the ordered token sequence.

16. The computing system of claim 11, wherein arranging the plurality of text tokens into the token sequence comprises:
   determining whether a first text token of the plurality of text tokens is located closer to the top of the structured paper document than a second text token; and
   in response, when yes, ordering the token sequence so that the first text token precedes the second text token within the ordered token sequence.

17. The computing system of claim 11, wherein the structured paper document comprises an item selected from a group consisting of an invoice and a receipt.

18. The computing system of claim 11, wherein the structured paper document is crumpled.

19. The computing system of claim 11, wherein the ordered token sequence spans the entire structured paper document.

20. The computing system of claim 11, wherein the neural network is configured to determine the field type according to the feature vector characterizing the respective text token, and further according to feature vectors characterizing other text tokens preceding and following the respective text token within the ordered token sequence.

21. A non-transitory computer-readable medium storing instructions which, when executed by at least one hardware processor of a computing system, cause the computing system to form a line segmentation engine, a text feature extractor, an image feature extractor, and a token classifier connected to the text feature extractor, the image feature extractor, and the line segmentation engine, wherein:
   the line segmentation engine is configured to linearize a text content of a document image comprising an encoding of an image of a structured paper document, the structured paper document partitioned into a plurality of fields and having a plurality of text tokens distributed among the plurality of fields, each field of the plurality of fields having a distinct field type characterizing a distinct category of information represented by text tokens located within the each field, wherein linearizing the text content of the document image comprises:
dividing the plurality of text tokens into a plurality of text lines of the structured paper document, and
concatenating the plurality of text lines to form the ordered token sequence; and the token classifier is configured to:
assemble an ordered input according to an order of the ordered token sequence, the ordered input comprising, for each text token of the ordered token sequence, a feature vector characterizing a respective text token as a whole and determined according to a character content of the respective text token and further according to a pixel content of a region of the document image showing the respective text token, and feed the ordered input to a neural network configured to determine a field type of a field containing the respective text token according to the ordered input.

* * * * *